United States Patent [19]

Miels et al.

[11] 3,750,912

[45] Aug. 7, 1973

[54] POWDER DISPENSER

[76] Inventors: Edward T. Miels, 4800 Williamsburg Ln. No. 133, La Mesa, Calif. 92041; Sven Andreasson, 6805 Lanewood Ct., San Diego, Calif.

[22] Filed: Nov. 24, 1971

[21] Appl. No.: 201,911

[52] U.S. Cl. ............................... 222/359, 222/370
[51] Int. Cl. ............................................ G01f 11/24
[58] Field of Search ........................... 222/359, 370

[56] References Cited
UNITED STATES PATENTS

| | | | |
|---|---|---|---|
| 3,522,902 | 8/1970 | Katz | 222/370 |
| 1,950,941 | 4/1934 | Green | 222/359 X |
| 3,269,612 | 8/1966 | Bode | 222/370 X |

*Primary Examiner*—Samuel F. Coleman
*Assistant Examiner*—John P. Shannon
*Attorney*—Richard K. Macneill

[57] ABSTRACT

A powder dispenser for dispensing a metered predetermined volume of powder, such as instant coffee, in which a ratchet arm is slidably received within a slot in the bottom of a container, the ratchet arm being spring biased outwardly with a retaining shoulder and having a plurality of teeth in contact with the teeth of a circular ratchet gear which is fixedly attached to a stirring paddle rotating with the ratchet gear ans stirring the contents of the housing; a dispensing disc coupled to the ratchet gear and disposed over a bottom plate in the housing and having a plurality of apertures dimensioned for carrying a premetered volume of powder; a spring detent for centering the apertures over an aperture in the bottom plate and for drop activation of the contained metered powder.

4 Claims, 7 Drawing Figures

PATENTED AUG 7 1973

INVENTORS
EDWARD T. MIELS
SVEN NMI ANDREASSON
BY
*Richard K. Macneill*

PATENTED AUG 7 1973 3,750,912

INVENTORS
EDWARD T. MIELS
BY SVEN NMI ANDREASSON

*Richard K. Macneill*

3,750,912

POWDER DISPENSER

BRIEF DESCRIPTION OF THE INVENTION

The present invention relates to a powder dispenser and more particularly to a powder dispenser for dispensing a premetered volume of powder.

According to the invention, a powder dispenser is provided having a housing for containing the powder to be dispensed with a bottom plate therein having a slot for receiving a ratchet arm which is spring loaded in an outward direction. A ratchet gear is coupled to a plurality of teeth in the ratchet arm and operable for rotating a predetermined amount when the ratchet arm is pressed into the bottom plate within the housing. A dispensing disc having a plurality of dispensing apertures therein dimensioned for carrying a premetered volume of powder is coupled to the ratchet gear for rotation therewith. The bottom plate has an aperture therein having location and geometery for mating with one of the dispensing apertures in the dispensing disc after the ratchet arm is depressed into the slot in the bottom plate. A detente spring locates one of the dispensing apertures directly over the aperture in the bottom plate for dispensing the powder carried within the dispensing aperture after it is centered or located over the aperture in the bottom plate. The detente spring also acts as a drop activator and prevents further powder from being dispensed through the apertures in alignment during the dispensing step. A stirring paddle is coupled to the ratchet gear for stirring the powder as the ratchet gear rotates to prevent caking thereof.

An object of the present invention is the provision of an improved powder dispenser.

Another object of the invention is the provision of a powder dispenser with an anti-caking feature.

A still further object of the invention is the provision of a powder dispenser which dispenses a premetered volume of powder.

Yet another object of the invention is the provision of a powder dispenser which is simple to operate and refill.

Other objects and many of the attendant advantages of this invention will be readily appreciated as the same becomes better understood by reference to the following detailed description when considered in connection with the accompanying drawings in which like reference numerals designate like parts throughout the FIGS thereof and wherein.

DETAILED DESCRIPTION OF THE DRAWINGS

Figure 1:
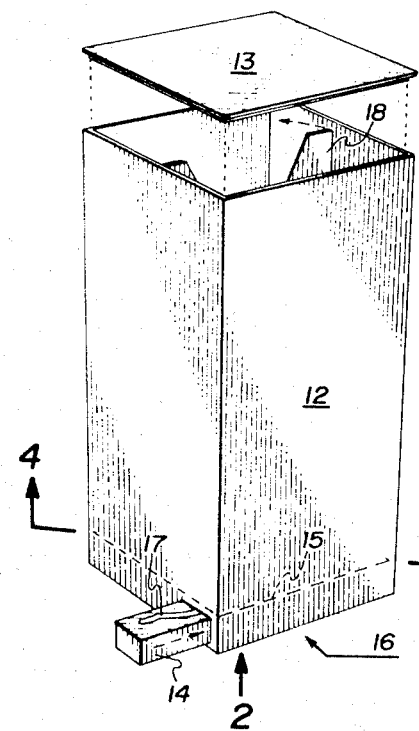
FIG. 1 is a perspective view, partially exploded, of the preferred embodiment of the present invention.

Referring to FIG. 1, the powder dispenser is shown generally at 11 having a housing 12 with a top 13 and a bottom 15. A ratchet arm 14 is slidably received by a bottom plate 16 and has a groove 17 therein. A paddle stirrer 18 is disposed within housing 12.

Figure 2:
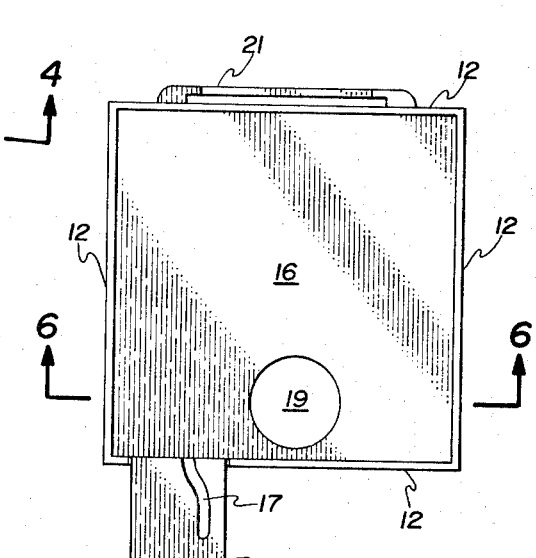
FIG. 2 is a bottom view of the embodiment of FIG. 1.

Referring to FIG. 2, bottom plate 16 is shown within housing 17. Bottom plate 16 has a dispensing aperture 19 and slidably receives a ratchet arm 14 having groove 17 therein. Hanging bracket 21 is disposed on one side of housing 12.

Figure 3:
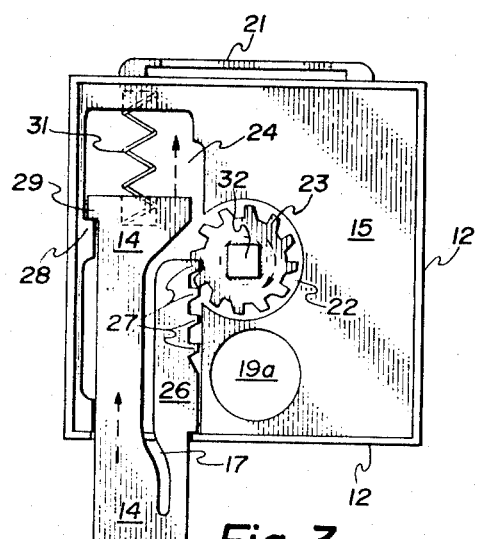
FIG. 3 is a bottom view of the embodiment of FIG. 1 with the bottom cover of the housing removed.

Referring to FIG. 3, bottom plate 16 is shown within housing 12. Bottom plate 16 has a dispensing aperture 19 and a ratchet aperture 22 having a ratchet gear 23 rotatably disposed therein. Bottom plate 16 also has a receiving slot 24 which receives ratchet arm 14. Slot 17 defines ratchet section 26 of ratchet arm 14 having a plurality of teeth 27 in operable proximity with ratchet gear 23. Slot 24 has a limiting shoulder 28 which cooperates with shoulder 29 of ratchet arm 14 to limit its outward movement. Compression spring 31 biases ratchet arm 14 outwardly from slot 24 in bottom plate 16. A hub 32 is fixedly attached to ratchet gear 23 and rotatably mounted (not shown) to bottom cover 15 of housing 12.

Figure 4:
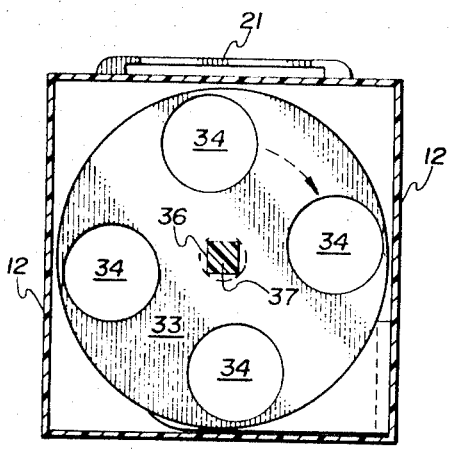
FIG. 4 is a sectional view taken along lines 4—4 of FIG. 1.

Referring to FIG. 4, a dispensing disc 33 has a plurality of dispensing apertures 34 therein and has a square aperture 36 which receives hub 37. A spring detente 38 is attached to one inside wall of housing 12 and is shown disposed over one of the dispensing apertures 34.

Figure 5:
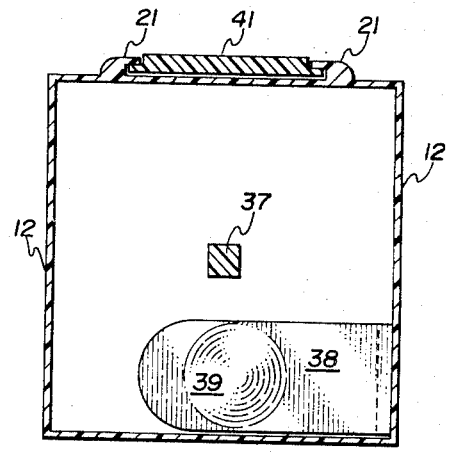
FIG. 5 is a top view of the detente spring of the present invention.

Referring to FIG. 5, a spring detente member 38 is shown attached to one wall of housing 12 with a circular recess 39 therein.

Figure 6:
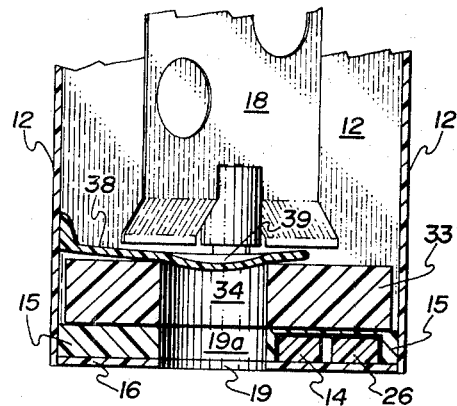
FIG. 6 is a side elevation section of a portion of the embodiment of FIG. 1.

Referring to FIG. 6, spring detente 38 having recessed portion 39 is shown disposed over one dispensing recess 34 of dispensing disc 33. The illustrated dispensing recess 34 is shown in vertical alignment with a dispensing aperture 41 in bottom plate 42 and an aperture 43 in bottom cover 15. Ratchet arm 14 is shown being received within bottom plate 42.

Figure 7:
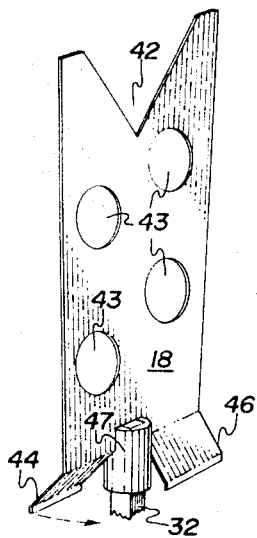
FIG. 7 illustrates a stirring paddle of the present invention in perspective.

Referring to FIG. 7, a stirring paddle is shown generally at 18 having a V 46 and apertures 47 therein. Stirring paddle 18 has oppositely extending bottom surfaces 48 and 49. Stirring paddle 18 is mounted within a slot in mounting member 49 which receives hub 32.

OPERATION

Referring now to all of the drawings, quiescently, the ratchet arm 14 is in the position shown, i.e., its outwardmost position limited by limiting shoulders 28 and 29. Housing 12 is filled with the powder which is desired to be dispensed such as instant coffee and lid 13 clampted in place. When it is desired to dispense a metered amount of coffee, ratchet arm 14 is pushed into recess 24 in bottom plate 16. The teeth of ratchet section 26 of ratchet arm 14 then engage the teeth of ratchet gear 23 rotating it a predetermined amount. At this time, one of the dispensing apertures 34 in dispensing disc 33 will be directly in line with dispensing aperture 41 in bottom plate 16 and drop activator and detente spring 38 will be in the position shown in FIG. 6 with the detente portion 39 aligning dispensing aperture 34 over dispensing aperture 41 and 43 in bottom plate 15. The powder trapped in dispensing aperture 34 will then drop through apertures 41 and 43 into a container held under these apertures. Ratchet arm 14 is then released and spring 31 returns it to the position shown in FIG. 3.

This action is repeated with each depression of ratchet arm 14. Paddle stirrer 18 agitates the powder within container 12 on each rotation and apertures 47 cooperate with V portion 46 and surface extensions 48 to insure a stirring of the powder within container 12 which obviates any possibility of caking.

It should be understood of course that the foregoing disclosure relates to only a preferred embodiment of the invention and that it is intended to cover all changes and modifications of the example of the invention herein chosen for the purposes of the disclosure which do not constitute departures from the spirit and scope of the invention.

What is claimed is:

1. A powder dispenser for dispensing a predetermined volume of powder comprising:
   a container;
   a bottom aperture in said container;
   a disc rotatably attached to a bottom portion of said container, said disc having a plurality of dispensing apertures therein;
   ratchet means coupled to said disc operable for rotating said disc through a predetermined arch for geometrically locating one of said dispensing apertures in vertical alignment with said bottom aperture in said container,
   said ratchet means comprising a circular ratchet gear fixedly attached to said dispensing disc and a ratchet arm slidably received by said container in operable proximity with said ratchet gear, and
   said ratchet arm being slidably received in a channel defined by a bottom plate in said container, said bottom plate having a dispensing aperture in vertical alignment with said bottom aperture.

2. The powder dispenser for dispensing a predetermined volume of powder of claim 1 wherein:
   said ratchet arm is spring biased outwardly from said container 3. The powder dispenser for dispensing a predetermined volume of powder of claim 1 and further including:
   a stirring paddle coupled to said ratchet gear.

4. The powder dispenser for dispensing a predetermined volume of powder of claim 1 and further including:
   a spring detent fixedly coupled to said container and positioned for centering one of said plurality of dispensing apertures over said bottom aperture.

* * * * *